United States Patent [19]

Freiberg et al.

[11] Patent Number: 5,066,520

[45] Date of Patent: Nov. 19, 1991

[54] METHOD OF PROTECTING POROUS MASONRY

[75] Inventors: Alan L. Freiberg, Midland; Harold V. Lefler, III, Sanford; Donald T. Liles, Midland, all of Mich.

[73] Assignee: Dow Corning Corporation, Midland, Mich.

[21] Appl. No.: 480,681

[22] Filed: Feb. 15, 1990

[30] Foreign Application Priority Data

Dec. 27, 1988 [JP] Japan .............................. 63-327796

[51] Int. Cl.$^5$ .............................................. B05D 3/02
[52] U.S. Cl. ................................... 427/379; 427/387; 427/393.6; 427/407.1; 428/447; 428/540; 428/703
[58] Field of Search ................... 427/379, 387, 393.6, 427/407.1; 428/447, 540, 703

[56] References Cited

U.S. PATENT DOCUMENTS

| | | | |
|---|---|---|---|
| 3,294,725 | 12/1966 | Findlay et al. | 260/29.2 |
| 4,221,688 | 9/1980 | Johnson et al. | 525/119 X |
| 4,273,813 | 6/1981 | Meddaugh | 427/387 |
| 4,427,811 | 1/1984 | Elias et al. | 524/96 |
| 4,433,007 | 2/1984 | Marwitz et al. | 427/407.1 X |
| 4,618,642 | 10/1986 | Schoenherr | 524/425 |
| 4,618,645 | 10/1986 | Bawman et al. | 524/745 |

*Primary Examiner*—Michael Lusignan
*Attorney, Agent, or Firm*—Edward C. Elliott

[57] ABSTRACT

A process for improving the adhesion of aqueous silicone elastomeric materials to porous masonry substrates consists essentially of first coating the substrate with an aqueous silicone emulsion which provides an elastomeric coating upon removal of the water, the emulsion having a viscosity of from 0.1 to 10 Pa.s at 25° C. and a pH of from 7 to 11.5 inclusive. After the first coating is dried to form a film, a second aqueous silicone emulsion which provides an elastomeric material upon removal of the water is applied. The second aqueous silicone emulsion has a solids content of greater than 15 percent by weight and a viscosity of greater than 10 Pa.s at 25° C. The second silicone emulsion is then allowed to dry, forming an elastomer firmly adhered to the substrate. The elastomer can be in the form of a coating to give protection to the substrate from the effects of water, pollution, or sunlight; or can be in the form of a sealant to seal spaces between masonry pieces.

7 Claims, No Drawings

METHOD OF PROTECTING POROUS MASONRY

BACKGROUND OF THE INVENTION

1. Field of the Invention

This invention relates to a method of using a water based primer on masonry, particularly concrete, to improve the bond of silicone water based coatings and sealants, and the masonry so protected.

2. Background Information

Findley and Weyenberg disclosed in U.S. Pat. No. 3,294,725, issued Dec. 27, 1966, a method of polymerizing siloxanes and silcarbanes in emulsion by using a surface active sulfonic acid catalyst. Johnson et al described in U.S. Pat. No. 4,221,688, issued Sep. 9, 1980 means for combining such emulsion polymers with an organic tin compound and silica to make emulsions which can be used as coatings.

In U.S. Pat. No. 4,273,813, issued Jun. 16, 1981, Meddaugh describes a method of providing waterproof coating for masonry walls.

A silicone elastomeric emulsion having improved shelf life is taught in U.S. Pat. No. 4,427,811. The emulsion is prepared by mixing an anionically stabilized, hydroxyl endblocked polydiorganosiloxane, colloidal silica, and an alkyl tin salt, ages for at least two weeks at room temperature, then adds filler other than colloidal silica.

An aqueous silicone elastomeric emulsion which was useful as a caulking material was described by Schoenherr in U.S. Pat. No. 4,618,642, issued Oct. 21, 1986.

Another method of producing an emulsion of crosslinked polydiorganosiloxane which yields an elastomer upon removal of the water emulsifies a mixture of hydroxyl endblocked polydiorganosiloxane, alkoxy silicone compound, anionic emulsifying agent, and water, then admixes surface active anionic catalyst. Maintaining at a pH of less that 5 at room temperature allows the ingredients to act and raise the molecular weight of the polydiorganosiloxane and to crosslink the polymer.

SUMMARY OF THE INVENTION

A process for improving the adhesion of aqueous silicone elastomeric materials to porous masonry substrates consists essentially of first coating the substrate with an aqueous silicone emulsion which provides an elastomeric coating upon removal of the water, the emulsion having a viscosity of from 0.1 to 10 Pa.s at 25° C. After the first coating is dried to form a film, a second aqueous silicone emulsion which provides an elastomeric material upon removal of the water is applied. The second aqueous silicone emulsion has a solids content of greater than 15 percent by weight and a viscosity of greater than 10 Pa.s at 25° C. The second silicone emulsion is then allowed to dry, forming an elastomer firmly adhered to the substrate.

DESCRIPTION OF THE INVENTION

This invention relates to a process for improving the adhesion of aqueous silicone elastomeric coatings to porous substrates consisting essentially of (A) coating the porous substrate with an aqueous silicone emulsion which provides an elastomeric coating upon removal of the water, said emulsion having a viscosity of from 0.1 to 10 Pa.s at 25° C. and a pH of from 7.0 to 11.5 inclusive in sufficient amount to provide a continuous primer coating over the surface of the substrate, then (B) allowing the primer coating to dry to form a film, then (C) applying a second aqueous silicone emulsion which provides an elastomeric material upon removal of the water over the primer film of (B), said second aqueous silicone emulsion having a solids content of greater than 15 percent by weight and a viscosity of greater than 10 Pa.s at 25° C., then (D) allowing the second aqueous silicone emulsion to dry to an elastomer.

Masonry blocks and panels are frequently used in building construction. Many masonry products, such as precast concrete, concrete blocks, many types of brick, sandstone, and limestone are porous to varying degrees. Many masonry materials, particularly concrete can be quite alkaline. Architectural coatings are applied over masonry surfaces to protect them from such things as acidic rain, to prevent the ingress of water, and to change their appearance. Sealants are applied to seal the spaces between sections of masonry panels. In many cases, the architectural coatings and sealants do not bond to the masonry substrate as well as is desired, particularly when exposed to water. Many coatings are also effected by the alkaline nature of the masonry. A process using a primer has been developed which gives an improved bond between the architectural coating or sealant and the masonry substrate. The primer coating also gives protection from the alkaline nature of the substrate.

A primer for use in the method of this invention is an aqueous silicone emulsion, drying to an elastomeric film, and having a viscosity of from 0.1 to 10 Pa.s at 25° C. and a pH of from 7.0 to 11.5 inclusive. The primer preferably has a viscosity of less than 5 Pa.s at 25° C. so that it penetrates into the substrate rather than just coats the surface as happens with higher viscosity materials. An aqueous silicone emulsion which can be used in this invention is a mixture of an anionic, emulsion polymerized polydiorganosiloxane, colloidal silica, and tin catalyst. The anionic, emulsion polymerized polydiorganosiloxane is preferably produced by the method described in U.S. Pat. No. 3,294,725, issued Dec. 27, 1966, which patent is hereby incorporated by reference to show the anionic, emulsion polymerized polydiorganosiloxane and its method of manufacture. The preferred polydiorganosiloxane is a hydroxyl endblocked polydimethylsiloxane having a molecular weight of greater than 50,000.

The colloidal silica can be any of the well known commercial colloidal silicas. Although any of the colloidal silicas can be used including fume colloidal silica and precipitated colloidal silica, the preferred colloidal silicas are those which are available in an aqueous medium. Colloidal silicas in an aqueous medium are usually available in a stabilized form, such as those stabilized with sodium ion, ammonia, or an aluminum ion. At least 1 part by weight of silica per 100 parts by weight of polydiorganosiloxane is required in order to show an improvement in properties. The upper amount of silica is determined by the viscosity limit on the emulsion, and the fact that colloidal silica in emulsion form is generally available only at less than 50 percent solids content. It is preferred that the silica be from 10 to 20 parts by weight per 100 parts by weight of the polydiorganosiloxane in order to give the coating obtain better physical strength while having the required viscosity.

Organic tin compound is used as a catalyst in the emulsion to produce a material which cures to an elastomer upon removal of the water in a reasonable time after manufacture of the mixture. A preferred organic tin compound is a diorganotindicarboxylate such as dioctyltindilaurate. The preferred amount of the tin catalyst is from 0.1 to 2 parts by weight for each 100 parts by weight of the polydiorganosiloxane.

Further discussion of a suitable silicone emulsion which provides elastomeric products upon the removal of the water is found in U.S. Pat. Nos. 4,221,688, issued Sept. 9, 1980, and 4,427,811, issued Jan. 24, 1984, which patents are incorporated by reference to show aqueous silicone emulsions and their manufacture.

Another suitable aqueous silicone emulsion is a mixture of an anionic, emulsion polymerized polydiorganosiloxane, alkoxysilane crosslinker, and tin catalyst. The alkoxysilane crosslinker may be either a tetraalkoxysilane or an organotrialkoxysilane. The tin catalyst can be any of the commonly used tin salts such as dialkyltindicarboxylate, or may be a stannous salt such as stannous octoate. The critical requirements for the aqueous silicone emulsion used as the primer in this method is that the emulsion cure at room temperature upon removal of the water to give a coherent elastomeric film, the emulsion be at a viscosity of less than 10 Pa.s at 25° C., preferably less than 5 Pa.s, and that the pH be from 7.0 to 11.5. The viscosity is needed within this range so that the emulsion penetrates into the substrate when applied. The pH is alkaline so that the emulsion does not react with the alkaline masonry substrate.

A suitable aqueous silicone emulsion is described in U.S. Pat. No. 4,618,645, issued Oct. 21, 1986, which is hereby incorporated by reference to describe an emulsion and its manufacture which can be used as the primer.

The strength and coherency of the elastomeric film can be improved by adding a reinforcing colloidal silica to the emulsion.

The silicone emulsion can also contain additives such as additional surfactant, antifoam agents, freeze-thaw stabilizers, and pigments. Of course, any additives should be tested to assure that the properties of the resulting emulsion or the elastomer produced by drying the emulsion are not impaired.

When aqueous silicone emulsion coatings or sealants are applied to masonry surfaces, the adhesion is sometimes not as great as is desired, particularly when the assembly is subjected to longtime water contact or immersion. In such cases, the use of the process of this invention is indicated. The use of a primer is more important as the porosity of the masonry increases. The effect of using the primer in this process is more evident with porous substrates such as sandstone and limestone. The aqueous silicone emulsion primer used in step (A) of this process is applied in an amount to give a continuous coating over the surface. The coating should be applied in an amount sufficient to show a continuous coating over the surface while it is still wet. As the emulsion dries to form an elastomeric surface firmly adhered to the masonry, the coating may be continuous or not, depending upon the amount applied, the solids content of the emulsion, and the porosity of the masonry.

The second aqueous emulsion of step (C), applied over the dried primer coating of step (B), may be in the form of either a coating material or a caulk material. A requirement of this topcoat is that it adhere to the primer of step (B). A preferred topcoat is an aqueous silicone emulsion similar in composition to the emulsion used as the primer, but having a higher solids content and a higher viscosity so that a strong, continuous film is formed as a protective layer when the water is removed. A preferred aqueous silicone emulsion is that described in U.S. Pat. No. 4,221,688, issued Sept. 9, 1980, which is hereby incorporated by reference to show suitable aqueous silicone emulsions and their method of manufacture. The preferred emulsion has a solids content of greater than 15 percent by weight, with a more preferred solids content of greater than 40 percent by weight. This solids content is desired in order to obtain a coherent dry film when the water evaporates. The viscosity of the topcoat is greater than 10 Pa.s at 25° C., preferably greater than 40 Pa.s, in order to be able to easily obtain a sufficient thickness of the wet coating without having to use multiple coats. A coating material which is applied by brushing has a maximum viscosity of about 150 Pa.s at 25° C. before it is of too high a viscosity to be practical for this method of application. A preferred viscosity range for a coating material is thus from 40 to 150 Pa.s The second aqueous silicone emulsion may have a viscosity such that it is of a paste consistency and be suitable for use as a caulking material. This is defined herein as a viscosity of greater than 150 Pa.s at 25° C. Caulking type materials generally have a solids content of greater than 70 percent by weight. A silicone elastomeric emulsion which can be used to produce either a protective coating or a caulking material is described in U.S. Pat. No. 4,427,811, issued Jan. 24, 1984, which is hereby incorporated to show suitable emulsions and their method of manufacture. The method disclosed in this invention mixes 100 parts by weight of an anionically stabilized, hydroxyl endblocked polydiorganosiloxane, from 1 to 100 parts by weight of colloidal silica, and from 0.1 to 1.5 parts by weight of alkyl tin salt, adjusts the pH to greater than 9 and then ages the base emulsion far a period of at least 2 weeks at room temperature. After the aging period from 10 to 200 parts by weight of a filler other than colloidal silica is added to give the coating material or caulking material, depending upon the consistency of the final product.

Another suitable caulking material is described in U.S. Pat. No. 4,618,642, issued Oct. 21, 1986, which is hereby incorporated by reference to show suitable silicone water based caulking material and it's method of manufacture. This caulk is obtained by mixing 100 parts by weight of an anionically stabilized, hydroxyl endblocked polydiorganosiloxane present as an emulsion having a pH of greater than 9 and a solids content of greater than 50 percent by weight, from 0.075 to 0.75 part by weight of dialkyltindicarboxylate, from 0.2 to 5 parts by weight of silane of the formula RSi(OR')$_3$, and from 50 to 200 parts by weight of inert, non-siliceous filler, to give a material having a total solids content of greater than 70 percent by weight and a paste type consistency.

Porous masonry substrates coated in accordance with the process of this invention are unique in the adhesion of the coating to the substrate, particularly after immersion in water. They form structures which are resistant to attack from water, airborne pollutants, and sunlight.

The following examples are included for illustrative purposes only and should not be construed as limiting the invention which is properly set forth in the appended claims. Parts are parts by weight.

EXAMPLE 1

Aqueous silicone sealant compositions were prepared by mixing together 147 parts of an anionically emulsified polydimethylsiloxane emulsion having a solids content of about 70 percent by weight and a pH of about 10, the emulsion particles being less than 0.6 micrometers in average diameter and the polymer having amolecular weight average of greater than 240,000, 0.45 part of vinyltrimethoxysilane, 0.5 part of a 50 percent solids by weight emulsion of dioctyltindilaurate, 0.3 part of silicone antifoam having a solids content of about 25 percent, 4.0 parts of titanium dioxide pigment, from 0.2 to 0.3 parts of 2-methyl-3(2-aminoethylamino)propyl(methyl)dimethoxysilane or a hydrolyzate thereof, 2.5 to 4.0 parts of 2-amino-2-methyl-1-propanol, and 110 parts of ultrafine calcium carbonate filler. The sealant had a solids content of about 80 percent by weight and was of a putty like viscosity.

Concrete samples were coated with a variety of potential primer materials, the primers allowed to dry, and then the above sealants applied to the primed surface by spreading a layer of sealant on the surface, embedding a reinforcement screen in the sealant, and applying another coating of sealant over the reinforcement. The sample was then allowed to cure at room temperature for 14 days at room temperature.

The adhesion of the sealant to the concrete was measured by cutting a 1 inch wide strip through the sealant to the concrete surface, then peeling the strip off the surface at 180 degrees to the surface, measuring the force required to do so. The surface of the concrete was then inspected to determine the percent of the surface that was still covered with sealant. If the sealant peeled off the surface without adhesion, it is an adhesive failure. If the sealant failed within the sealant so that there was sealant still present on the concrete surface, it was cohesive failure. The higher the percent of cohesive failure, the better the adhesion between the sealant and concrete. The samples were then immersed in water for 1 day and tested, then immersed in water for 7 days and tested, with the results shown in Table I.

Primer A was comparative primer of a 15 percent by weight solids solution in naphtha of equal parts by weight of normal propylorthosilicate, methyl cellosolve orthosilicate, and tetrabutyltitanate.

Primer B was a comparative primer containing 4.3 percent by weight epoxy resin, 0.5 percent N-(betaaminoethyl)gamma-aminopropyltrimethoxysilane, and solvent.

Primer C was a comparative primer from a commercial concern which is used as a primer on masonry for acrylic caulking materials.

Primer D was a comparative primer from a commercial concern which is used as a primer on concrete highways for silicone caulking materials.

Primer E was a comparative silicone emulsion produced by mixing 55 parts of an emulsion of an anionic, emulsion polymerized polydimethylsiloxane having a solids content of about 60 percent by weight and a pH of about 10, 0.16 part of 50 percent solids by weight emulsion of dioctyltindilaurate, 0.14 part of silicone antifoam having a solids content of about 25 percent by weight and a pH of about 3.5, 0.65 part of diethylamine, 3.7 part of acrylic thickener, 0.16 part of propylene glycol, 8.4 parts of titanium dioxide pigment, and 32 parts of a 15 percent by weight solids dispersion of colloidal silica in water, the silica having a surface area of about 750 m$^2$/g. The emulsion had a viscosity of about 25 Pa.s at 25° C. and a solids content of about 40 percent by weight.

Primer F was a silicone emulsion produced by mixing 63 parts of the silicone emulsion of primer E, 0.18 part of a 50 percent solids by weight emulsion of dioctyltindilaurate, 0.1 part of silicone antifoam having a solids content of about 25 percent, 0.7 part of diethylamine, and 36 parts of the colloidal dispersion of silica in water of primer E. The emulsion had a viscosity of about 0.5 Pa.s at 25° C. and a solids content of about 40 percent by weight.

TABLE I

| Primer | Adhesion 14 Day Cure | | +1 day H$_2$O | | +7 day H$_2$O | |
|---|---|---|---|---|---|---|
| | lbs. | % CF | lbs. | % CF | lbs. | % CF |
| none | 13 | 0 | 9 | 0 | 3 | 0 |
| A* | 16 | 5 | 14 | 0 | 12 | 0 |
| B* | 12 | 0 | 13 | 0 | 6 | 0 |
| C* | 26 | 30 | 12 | 0 | 10 | 0 |
| D* | 20 | 20 | 10 | 0 | 10 | 0 |
| E* | 27 | 60 | 12 | 0 | 12 | 0 |
| F | 31 | 90 | 28 | 100 | 22 | 65 |
| F | 21 | 90 | 14 | 100 | 15 | 100 |
| F | 27 | 30 | 19 | 100 | 19 | 90 |
| F | 28 | 30 | 15 | 100 | 15 | 100 |

*comparative examples
% CF is percent cohesive failure
Primer F is shown with various sealant batches.

EXAMPLE 2

The primer F of example 1 was diluted with three different diluents to evaluate the best solids and viscosity to use for priming for an architectural coating. Diluent 1 was a mixture of 5959 g of tap water and 29.6 g of diethylamine to give 0.5 percent amine in water. Diluent 2 was tap water. Diluent 3 was 6000 g of tap water and 150 grams of 2-amino-2-methyl-1-propanol. Sample primers were prepared by mixing 850 g of primer F with 850 g of each of the 3 diluents, to give 20 percent solids; mixing 1275 g of primer F with 425 g of each diluent, to give 10 percent by weight solids; and mixing 1417 g of primer F with 283 g of each diluent, to give 6.7 percent by weight solids.

Then portions of the above primers were further mixed with an acrylate thickener to give emulsions of about 5, 10, and 20 Pa.s at 25° C. viscosity. Viscosities were remeasured after 6 months to evaluate stability. Samples of the various primers as shown in Table II were then evaluated for separation stability as room temperature by storing is 8 inch high test tubes for 3 and 6 months. Each primer was evaluated for freeze-thaw stability by placing some in a 1 once vial, sealing, and freezing at 0° C. for 16 hours, then thawing. This cycle was repeated until the emulsion failed.

Each primer was evaluated for particle size. They all were between 150 to 500 nanometres mean diameter. All of the primers passed a 7 day at 50° C. aging test as well as a centrifuge test.

The primers were then evaluated by coating on porous substrates and overcoating with an aqueous silicone emulsion intended for use as an architectural coating. Panels 3 inches by 6 inches of broom face precast concrete, cut face precast concrete, standard concrete block, sandstone, and limestone were cleaned, then primed by applying the primer with the panel in a vertical position to the point of runoff. The thickened primers were brushed out to as thin a coat as possible. After drying, a 0.020 inch thick film of architectural silicone emulsion was applied by use of shims and a drawdown blade. A ¼ inch wide folded strip of cheesecloth was saturated with the emulsion, then two layers of this applied to the wet coating. After curing overnight, those panels which did not have a saturated coating received another coat, which was then dried. The panels were cured at room temperature for 14 days, then tested for 180 degree peel.

For the peel test, the ½ inch strips were cut along the edges of the strip to the concrete surface, then the force required to peel the reinforced strip from the surface at a 180 degree angle was measured. The samples were then soaked in water for 24 hours and the peel measured while still wet. The results of these peel tests are shown in Table II.

The aqueous silicone emulsion intended for use as an architectural coating was an emulsion of a 65 percent solids emulsion polymerized polydimethylsiloxane, aqueous colloidal silica, tin catalyst, thickener, pigment, and antifoam. It had a viscosity of about 50 Pa.s at 25° C.

TABLE III-continued

| | 180 degree Peel Adhesion pounds per inch width | | | | |
|---|---|---|---|---|---|
| | | | Substrate | | |
| Primer | BPC | CPC | SCB1 | Sdst | Lmst |
| none | 0.3-3 | 2-3 | 0.4-1 | 2-3 | 0 |

BPC is broom face precast concrete
CPC is cut face precast concrete
SCB1 is standard concrete block
Sdst is sandstone
Lmst is limestone

EXAMPLE 3

An adhesion test based upon the Japanese Industrial Standards for coatings, JIS A 6910-1984 was used to further evaluate the primers of example 2.

In this test, 3 inch by 6 inch panels of each substrate were cleaned with compressed air, then brush coated in a vertical position with each of the primers, applied to

TABLE II

| Primer | Diluent | Solids percent | Thickener grams | Viscosity Initial | Viscosity 6 months | Separation Stability 6 months | Freeze/Thaw cycles |
|---|---|---|---|---|---|---|---|
| 1 | none | 40 | none | 1310 | — | 1 inch | 0 |
| 2 | DEA/water | 20 | none | — | 1/16 | 0 | |
| 3 | " | " | 12 | 5000 | 4880 | 1/16 | 0 |
| 4 | " | " | 15.1 | 10200 | 6180 | none | 0 |
| 5 | " | " | 17.5 | 19800 | 15400 | none | 0 |
| 6 | " | 10 | none | | | | |
| 7 | " | 6.7 | none | — | ⅛ | 0 | |
| 8 | " | " | 4 | 4920 | 7280 | ⅛ | 0 |
| 9 | " | " | 9 | 9920 | 7760 | none | 0 |
| 10 | " | " | 18 | 19700 | 15400 | none | 0 |
| 11 | water | 20 | none | — | 1/16 | | 0 |
| 12 | " | " | 11.2 | 4880 | 13900 | none | 0 |
| 13 | " | " | 12.5 | 9920 | gelled | 1/16 | 0 |
| 14 | " | " | 17.5 | 10400 | — | — | 0 |
| 15 | " | 10 | none | — | | | |
| 16 | " | 6.7 | none | — | | ⅛ | 0 |
| 17 | " | " | 10 | 4160 | moldy | none | 0 |
| 18 | " | " | 11 | 8560 | " | none | 0 |
| 19 | " | " | 12.5 | 17000 | 24000 | none | 0 |
| 20 | amp/water | 20 | none | — | | 1/16 | 0 |
| 21 | " | " | 12 | 4560 | 3440 | none | >15 |
| 22 | " | " | 17 | 9840 | 4560 | none | >15 |
| 23 | " | " | 18.6 | 19900 | 8640 | none | >15 |
| 24 | " | 10 | none | — | | | |
| 25 | " | 6.7 | none | — | 1/16 | 2 | |
| 26 | " | " | 4.5 | 4520 | 6960 | 1/16 | 3 |
| 27 | " | " | 11 | 9120 | 9040 | ⅛ | 3 |
| 28 | " | " | 14.5 | 19700 | 12800 | none | 3 |

TABLE III

| | 180 degree Peel Adhesion pounds per inch width | | | | |
|---|---|---|---|---|---|
| | | | Substrate | | |
| Primer | BPC | CPC | SCB1 | Sdst | Lmst |
| tested as cured | | | | | |
| 1 | — | — | 12-13 | 14-15 | 6-7 |
| 20 | — | — | 10-13 | 13-13.5 | 3-5 |
| 24 | 6-8 | 8-11 | 13-18 | 15-16 | 2-3 |
| 25 | 4-10 | 6-8 | — | — | — |
| 26 | — | — | 8-10 | 7-9 | — |
| none | 4-6 | 6-10 | 4.5-5 | 6-8 | 2-3 |
| tested wet after 24 hour immersion in water | | | | | |
| 1 | — | — | 4-5 | 5-6 | 0.4-1 |
| 20 | — | — | 4-6 | 5 | 1 |
| 24 | 0.9-1 | 0.5-2 | 6-6.5 | 5-6 | 0.6-0.8 |
| 25 | 2 | 0.3-1 | — | — | — |
| 26 | — | — | 5-6 | 3-4 | — | the point of runoff, except for the thickened primer, which was brushed as thinly as possible. After drying of the primer, the aqueous silicone emulsion architectural coating was applied and cured as in example 2.

A steel block with a surface area of about two square inches was then bonded to the surface of the architectural coating using a neutral, two-part, elastomeric silicone adhesive. After curing of the adhesive, the samples were evaluated for bonding of the architectural coating to the substrate by pulling the block off the surface of the substrate at a rate of 0.05 inches per minute and measuring the force required to obtain a failure of the bond. The results, converted to pounds per square inch of surface area are shown in Table IV. Additional similar samples were then exposed to moisture by placing the blocks in a pan of water so that only the upper coated surface of the blocks was out of water. After 10 days moisture exposure, the surface was cleaned by wiping with toluene and coating with a silane primer, then the steel blocks were adhered as above. The water soaked samples were then tested as in the case of the dry samples above with the results shown in Table IV.

TABLE IV

| Primer | BPC | CPC | Substrate SCB1 | Sdst | Lmst |
|---|---|---|---|---|---|
| tested as cured | | | | | |
| 1 | — | — | 161–171 | 133–145 | 125–158 |
| 20 | — | — | 130–174 | 147–167 | 98–110 |
| 24 | 123–128 | 98–121 | 129–165 | 107–146 | 111–114 |
| 25 | 70–113 | 93–99 | — | — | — |
| 26 | — | — | 126–169 | 109–140 | — |
| none | 98–127 | 86 | 135–164 | 111–113 | 17–51 |
| tested wet after 10 day soak in water | | | | | |
| 1 | — | — | 155 | 56–70 | 91–103 |
| 20 | — | — | 155–159 | 54–59 | 48–74 |
| 24 | 60 | 44–69 | 140–158 | 72–76 | 88–89 |
| 25 | 34 | 45–47 | — | — | — |
| 26 | — | — | — | 60–62 | — |
| none | 76–87 | 85–90 | 105–122 | 35–40 | 45–57 |

EXAMPLE 4

A primer, G, was prepared by mixing together 100 g of an emulsion of an anionic, emulsion polymerized polyimethylsiloxane having a solids content of about 60 percent by weight, a viscosity of about 1 Pa.s, and a pH of about 10, 0.75 g of antifoam, 3.5 g of 2-amino-2-methyl-1-propanol, 0.6 g of vinyltrimethoxysilane, 0.4 g of 50 percent solids by weight emulsion of dioctyltindilaurate, and 97.6 g of water. The primer was prepared by adding the water to a jar, stirring in the 2-amino-2-methyl-1-propanol, adding the antifoam, then the emulsion polymer, the tin catalyst, and lastly, the vinyltrimethoxysilane. The mixture was allowed to react for overnight at room temperature before use. The primer had a solids content of 28 percent by weight, a viscosity of about 0.5 Pa.s, and a pH of about 11.

A primer, H, was prepared by mixing 100 g of the above primer G with 15 g of the emulsion of colloidal silica of primer E by slowly adding with mixing the silica emulsion to the primer G emulsion.

A primer, I, was prepared by mixing 50 parts of primer F, 1.2 parts of 2-amino-2-methyl-1-propanol, and 48.8 parts of water.

These primers were evaluated on sandstone and concrete block substrates in same manner as in example 2. After applying and drying the primers, an aqueous silicone emulsion intended for use as an architectural coating was applied. This emulsion was a 55 percent solids emulsion, having a viscosity of about 50 Pa.s at 25° C., prepared by mixing 56 parts of an anionically emulsified polydimethylsiloxane emulsion having a solids content of about 70 percent by weight and a pH of about 10, the emulsion particles being less than 0.6 micrometers in average diameter and the polymer having a molecular weight average of greater than 240,000, 33 parts of an emulsion of colloidal silica having 50 percent by weight colloidal silica with a surface area of about 50 m²/g, 0.2 part of 50 percent solids by weight emulsion of dioctyltindilaurate, antifoam, freeze-thaw additive, 2 parts of a thickener of alkali swellable acrylic emulsion, and 6 parts of pigment. The coating was prepared by adding to a mixer the emulsion of colloidal silica, then 2-amino-2-methyl-1-propanol for pH control, then the polydimethylsiloxane emulsion, the antifoam and tin catalyst, the freeze-thaw additive, and the thickener and pigment. The adhesion of the architectural coating to the substrate was measured by 180 degree peel test with the results shown in Table V.

TABLE V

| | 180 degree Peel Adhesion pounds per inch width | |
|---|---|---|
| Primer | sandstone | Substrate concrete block |
| tested as cured | | |
| G | 8.8/ 50% cohesive | 4.8/ 0% cohesive |
| H | 11 85 | 7 80 |
| I | 9.3 100 | 11.7/ 30 |
| none | 7 — | 5 — |
| tested after 24 hour immersion in water | | |
| G | 4.3/ 100% cohesive | 2.3/ 0% cohesive |
| H | 4.8 100 | 3 80 |
| I | 3 100 | 3.6/ 100 |
| none | 2.5 — | 0.6 — |

EXAMPLE 5

A primer, J, was prepared by mixing 100 parts of the anionic, emulsion polymerized polydimethylsiloxane of primer G, by adding 166 parts of the emulsion, 0.5 part of stannous octoate, and 1 part of N-3-(phenylamino)-trimethoxysilane. Then 2 parts of 2-amino-2-methyl-1-propanol and 100 parts of the emulsion of colloidal silica of primer E was admixed (15 parts of colloidal silica). The primer had a viscosity of about 0.5 Pa.s, a pH of 10.5, and a solids content of about 40 percent.

A primer, K, was prepared by mixing a base material of 400 g of the emulsion of anionic, emulsion polymerized polydimethylsiloxane, 0.5 g of stannous octoate, and 1.5 g of n-propylorthosilicate, waiting for 4 hours, then adding 100 g of the colloidal silica dispersion of primer E. Then 50 g of the base material was then mixed with 50 g of water and adjusted to a pH of 8.75 with 1N HCl.

Test samples were then prepared and tested as in example 4 with the results shown in Table VI.

TABLE VI

| | 180 degree Peel Adhesion pounds per inch width | |
|---|---|---|
| Primer | sandstone | Substrate concrete block |
| tested after 24 hour immersion in water | | |
| J | 5.3/ 90% cohesive | 5.6/ 75% cohesive |
| K | 5.4 95 | 4 75 |
| none | 2.5 — | 0.6 — |

That which is claimed is:

1. A process for improving the adhesion of aqueous silicone elastomeric coatings to porous substrates consisting essentially of
   (A) coating the porous substrate with an aqueous silicone emulsion which provides an elastomeric coating upon removal of the water, said emulsion having a viscosity of from 0.1 to 10 Pa.s at 25° C. and a pH of from 7.0 to 11.5 inclusive in sufficient amount to provide a continuous primer coating over the surface of the substrate, then
   (B) allowing the primer coating to dry to form a film, then
   (C) applying a second aqueous silicone emulsion which provides an elastomeric material upon removal of the water over the primer film of (B), said second aqueous silicone emulsion having a solids content of greater than 15 percent by weight and a viscosity of greater than 10 Pa.s at 25° C., then
   (D) allowing the second aqueous silicone emulsion to dry to an elastomer.

2. The process of claim 1 in which the aqueous silicone emulsion of step (A) had a viscosity of less than 5 Pa.s at 25° C.

3. The process of claim 1 in which the aqueous silicone emulsion of step (C) is a coating material having a solids content of greater than 40 percent by weight and a viscosity of from about 10 to 150 Pa.s at 25° C.

4. The process of claim 1 in which the aqueous silicone emulsion of step (C) is a caulking material having a solids content of greater than about 70 percent by weight and a viscosity of greater than 150 Pa.s at 25° C.

5. The process of claim 2 in which the aqueous silicone emulsion of step (C) is a coating material having a viscosity of greater than 40 Pa.s at 25° C.

6. A porous substrate coated by the process of claim 1.

7. A porous masonry substrate having an elastomeric silicone material adhered to it by a process consisting essentially of
(A) coating the porous substrate with an aqueous silicone emulsion which provides an elastomeric coating upon removal of the water, said emulsion having a viscosity of from 0.1 to 10 Pa.s at 25° C. and a pH of from 7.0 to 11.5 inclusive in sufficient amount to provide a continuous primer coating over the surface of the substrate, then
(B) allowing the primer coating to dry to form a film, then
(C) applying a second aqueous silicone emulsion which provides an elastomeric material upon removal of the water over the primer film of (B), said second aqueous silicone emulsion having a solids content of greater than 15 percent by weight and a viscosity of greater than 10 Pa.s at 25° C., then
(D) allowing the second aqueous silicone emulsion to dry to an elastomer.

* * * * *